US010608385B2

(12) United States Patent
Kiyuna et al.

(10) Patent No.: US 10,608,385 B2
(45) Date of Patent: Mar. 31, 2020

(54) CONNECTOR STRUCTURE AND ELECTRIC VEHICLE

(71) Applicant: HONDA MOTOR CO., LTD., Minato-ku, Tokyo (JP)

(72) Inventors: Miharu Kiyuna, Wako (JP); Yusuke Ozaki, Wako (JP); Tomoyuki Suzuki, Wako (JP); Ayumu Uno, Wako (JP); Yasuhisa Kume, Wako (JP); Makoto Kawahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/433,015

(22) Filed: Jun. 6, 2019

(65) Prior Publication Data

US 2019/0288461 A1    Sep. 19, 2019

Related U.S. Application Data

(63) Continuation of application No. 15/817,484, filed on Nov. 20, 2017, now Pat. No. 10,348,041.

(30) Foreign Application Priority Data

Nov. 24, 2016   (JP) .................. 2016-228051

(51) Int. Cl.
| | |
|---|---|
| *H01R 12/00* | (2006.01) |
| *H01R 13/68* | (2011.01) |
| *B60L 53/16* | (2019.01) |
| *B60K 6/22* | (2007.10) |
| *H01R 13/405* | (2006.01) |
| *H01R 13/64* | (2006.01) |

(Continued)

(52) U.S. Cl.
CPC ............... *H01R 13/68* (2013.01); *B60K 6/22* (2013.01); *B60L 53/16* (2019.02); *H01R 13/405* (2013.01); *H01R 13/64* (2013.01); *H01R 13/703* (2013.01); *H01R 13/688* (2013.01); *H01R 2201/26* (2013.01); *Y02T 90/121* (2013.01)

(58) Field of Classification Search
CPC .............................. H05K 7/026; H01R 13/447
USPC ................................................. 439/76.2, 135
See application file for complete search history.

(56) References Cited

U.S. PATENT DOCUMENTS

| | | |
|---|---|---|
| 2,932,811 A | 4/1960 | Abraham et al. |
| 4,250,349 A | 2/1981 | Bennett |

(Continued)

FOREIGN PATENT DOCUMENTS

| | | |
|---|---|---|
| JP | 54-084590 | 6/1979 |
| JP | 61-005027 | 2/1986 |

(Continued)

OTHER PUBLICATIONS

Japanese Office Action for Japanese Patent Application No. 2016-228051 dated Jul. 3, 2018.

(Continued)

*Primary Examiner* — Thanh Tam T Le
(74) *Attorney, Agent, or Firm* — Amin, Turocy & Watson, LLP

(57) ABSTRACT

A connector structure installed in the electric vehicle includes a plurality of connectors, an inter-connector conductive member configured to electrically connect the plurality of connectors, and a connector casing configured to house the inter-connector conductive member. A cover is attached to the unused connector of the plurality of connectors.

11 Claims, 11 Drawing Sheets

(51) Int. Cl.
*H01R 13/703* (2006.01)
*H01R 13/688* (2011.01)

(56) References Cited

U.S. PATENT DOCUMENTS

| | | | |
|---|---|---|---|
| 4,408,813 | A | 10/1983 | Koehler |
| 4,801,271 | A | 1/1989 | Piper |
| 5,096,430 | A | 3/1992 | D'Amico |
| 5,542,852 | A | 8/1996 | Hsueh |
| 5,764,487 | A | 6/1998 | Natsume |
| 6,496,096 | B2 | 12/2002 | Kondo et al. |
| 6,796,808 | B2 | 9/2004 | Hosoe et al. |
| 6,805,580 | B2 | 10/2004 | Piedmont |
| 7,914,306 | B1 | 3/2011 | Blackwell |
| 8,350,151 | B2 | 1/2013 | Asao |
| 8,628,338 | B2 | 1/2014 | Miyamoto |
| 2018/0001849 | A1 | 1/2018 | Abe et al. |

FOREIGN PATENT DOCUMENTS

| | | |
|---|---|---|
| JP | 3843074 | 11/2006 |
| JP | 2012-155943 | 8/2012 |
| JP | 2018-007378 | 1/2018 |

OTHER PUBLICATIONS

Non-Final Office Action for U.S. Appl. No. 15/817,484 dated Nov. 1, 2018.
Japanese Office Action for Japanese Patent Application No. 2018-192396 dated Nov. 5, 2019.

CONNECTOR STRUCTURE AND ELECTRIC VEHICLE

CROSS-REFERENCE TO RELATED APPLICATIONS

This application is a Continuation of application Ser. No. 15/817,484 filed on Nov. 20, 2017, the contents of which are incorporated herein by reference.

This application is based upon and claims the benefit of priority from Japanese Patent Application No. 2016-228051 filed on Nov. 24, 2016, the contents of which are incorporated herein by reference.

BACKGROUND OF THE INVENTION

Field of the Invention

The present invention relates to a connector structure that is installed in a vehicle, for example, and supplies power to accessories, and an electric vehicle in which the connector structure is installed.

Description of the Related Art

A task of a connector fitting structure disclosed in Japanese Patent No. 3843074 is to easily fit and detach a plurality of connectors and easily replace fuses in the connectors.

To achieve the above task, the connector fitting structure adopts a structure including a slide structure that is movably arranged in a connector fitting direction in one connector group and includes a temporary locking unit for the other connector group, and a bolt that is screwed to the slide structure and enables movement of the slide structure in the connector fitting direction with respect to the one connector group.

Inside a hook portion of the one connector group, a drive plate on a side of a bolt distal end is located. An inner cover member including the hook portion is detachably fixed to a side of the one connector group, and the fuses are attached to the connector group inside the inner cover member. The slide structure includes a temporary locking frame that includes the temporary locking unit, and an outer cover member that includes a bolt and is rotatably coupled to the temporary locking frame.

A task of a fuse built-in connector disclosed in Japanese Laid-Open Patent Publication No. 2012-155943 is to provide the fuse built-in connector that saves labor of unmounting a service cover only by unmounting a connector, and can reduce parts such as the service cover and an interlock circuit for the service cover.

To achieve the above task, a housing of the fuse built-in connector includes an opening portion on a male connector connected with a female connector. The opening portion includes a fuse, an inverter connection terminal, and an interlock terminal that detects unmounting of a male connector and interrupts power distribution.

The housing includes a positive battery cable and a negative battery cable that are connected with the battery, and a positive A/C cable and a negative A/C cable that are branched from the battery cables and are connected with an electric air conditioner.

SUMMARY OF THE INVENTION

Due to a difference in car models such as a HEV (Hybrid Electric Vehicle), a PHEV (Plug-in Hybrid Electric Vehicle) and a BEV (Battery Electric Vehicle), and a difference in a specification such as two-wheel drive and four-wheel drive of the same car model, the number of power supply target components (accessories or auxiliaries) differs.

According to Japanese Patent No. 3843074 and Japanese Laid-Open Patent Publication No. 2012-155943, there is a concern that when the number of components of a vehicle increases, it is necessary to newly redesign a connector group (a cover, a shield shell, busbars and mounting points), which leads to an increase in design man-hours, an increase in inventory control man-hours and an increase in manufacturing man-hours. There is also a problem that a size of the entire connector fitting structure is large.

The present invention has been made to solve the above-mentioned problem. An object of the present invention is to provide a connector structure and an electric vehicle that, even when a difference in a car model or a specification increases the number of components, can make it unnecessary to newly change a connector shape (the entire structure, busbars, fuses, etc.) or can make a shape change less, in order to reduce design man-hours and manufacturing cost.

The present invention has the following features.

[1] A connector structure according to a first aspect of the present invention is a connector structure that is installed in an electric vehicle, that includes: a plurality of connectors; an inter-connector conductive member configured to electrically connect the plurality of connectors; and a casing configured to house the inter-connector conductive member, and in which a cover is attached to an unused connector of the plurality of connectors.

Even when various car models or specifications increase the number of components, by providing multiple connectors in advance, it is possible to make it unnecessary to newly change a connector shape (an entire structure, busbars, fuses, etc.), or decrease the change of shape, reduce design man-hours and reduce manufacturing cost.

A car model having a small number of components includes an unused connector. However, by attaching a cover to the unused connector, it is possible to provide a waterproof/dust-proof effect.

[2] According to the first aspect of the present invention, the inter-connector conductive member may include a first conductive member electrically connected with a first electrode conductive portion of a first connector of the connectors, a second conductive member electrically connected with a second electrode conductive portion of a second connector of the connectors, a first connection terminal provided to the first conductive member, and a second connection terminal provided to the second conductive member, and a fuse may be inserted in and electrically connected with the first connection terminal and the second connection terminal.

It is easy to mount the fuse by a fuse-insertion method of electrically connecting the fuse between the first connection terminal and the second connection terminal. It is possible to realize a compact structure compared to electrical connection that uses bolts or the like, and miniaturize the entire connector structure.

[3] According to the first aspect of the present invention, the casing may include at least a first casing configured to support at least the connectors, and a second casing configured to support at least the fuse, the first casing and the second casing may be separable.

The first casing that supports the connectors, and the second casing that supports the fuse are separable. Consequently, it is easy to electrically connect the first conductive member and the second conductive member during manufacturing.

[4] According to the first aspect of the present invention, an electrode conductive portion of at least one of the connectors may include a cylindrical portion and an extended portion, the cylindrical portion having a cylindrical shape extending in a mounting direction, and including a cutout extending in the mounting direction, the extended portion extending outwardly from a portion of the cutout in the cylindrical portion, and the extended portion and the inter-connector conductive member may be electrically connected.

The electrode conductive portion of the connector is formed in the cylindrical shape, and the cutout extending in the mounting direction is formed. Consequently, when the electrode conductive portion of the other connector is mounted on the electrode conductive portion of the cylindrical portion, the electrode conductive portion of the cylindrical shape elastically deforms to expand in a radial direction. Consequently, it is possible to easily mount the electrode conductive portion of the other connector in the electrode conductive portion of the cylindrical portion. The same applies to a case where the electrode conductive portion in the cylindrical shape is mounted on the electrode conductive portion of the other connector, too.

The extended portion extending from a portion of the cutout of the electrode conductive portion is formed. Consequently, it is possible to easily connect the extended portion and the inter-connector conductive member.

In this case, as described above, the electrode conductive portion of the connector is formed in a cylindrical shape, and the cutout extending in the mounting direction is formed. Consequently, after the extended portion and the inter-connector conductive member are connected, and when the electrode conductive portion of the other connector is mounted on the electrode conductive portion of the cylindrical portion, the electrode conductive portion of the cylindrical shape elastically deforms to expand in the radial direction from the extended portion connected with the inter-connector conductive member as a base point. It is possible to easily mount the electrode conductive portion of the other connector in the electrode conductive portion having the cylindrical shape.

[5] According to the first aspect of the present invention, an end portion of the cylindrical portion may include an expanded portion expanding in a direction perpendicular to the mounting direction, and being configured to allow an end portion of an electrode conductive portion of another connector to be inserted therein.

By inserting the end portion of the electrode conductive portion of the other connector to the expanded portion of the cylindrical portion, it is possible to connect the one connector and the other connector without using bolt connection or the like, thereby reducing the number of parts and simplifying a connection operation.

[6] The first aspect of the present invention may include at least the two connector structures according to above [5], and in the expanded portion of the cylindrical portion in one sub-connector structure, an end portion opposite to the expanded portion of the cylindrical portion in another sub-connector structure may be inserted for electrical connection.

It is effective to use a method of arranging a large number of connectors in advance to prepare for an increase in the number of accessories mounted on an electric vehicle. Alternatively, by inserting the end portion opposite to the expanded portion having the cylindrical shape of the other connector structure, in the expanded portion in the cylindrical portion of the one connector structure for electrical connection, it is possible to easily increase the number of connectors.

[7] According to the first aspect of the present invention, one of an electrode conductive portion of the connector and an electrode conductive portion of another connector may include a first busbar in a plate shape extending in a mounting direction, a hole formed in the first busbar, another of the electrode conductive portion of the connector and the electrode conductive portion of the other connector may include a second busbar extending in the mounting direction, a first inclined portion raised in one direction from a plate surface of the second busbar, and a second inclined portion extending from a top portion of the first inclined portion toward the plate surface of the second busbar, and the plate surface of the second busbar and the second inclined portion may sandwich and hold the first busbar.

By pressing the one connector and the other connector against each other and further moving them in a direction to move away from each other, the one connector and the other connector can be connected firmly. When the other connector is detached from the one connector, by pressing the one connector and the other connector against each other and further moving them in the direction to move away from each other similar to the above, the other connector can be easily detached from the one connector.

[8] According to the first aspect of the present invention, one of the connector and the casing may include a first busbar of a plate shape extending in a mounting direction, a hole formed in the first busbar, another of the connector and the casing may include a second busbar extending in the mounting direction, a first inclined portion raised in one direction from a plate surface of the second busbar, and a second inclined portion extending from a top portion of the first inclined portion toward the plate surface of the second busbar, and the plate surface of the second busbar and the second inclined portion may sandwich the first busbar.

By pressing the casing and the connector against each other and further moving them in the direction to move away from each other, the connector can be connected with the casing firmly. When the connector is detached from the casing, by pressing the casing and the connector against each other and further moving them in the direction to move away from each other similar to the above, the connector can be easily detached from the casing. It is possible to connect and fix the connector and the casing without using a fastening member such as a bolt, thereby reducing the number of parts and simplifying a connection operation.

[9] According to the first aspect of the present invention, the first inclined portion and the second inclined portion may be formed integrally with the second busbar. By punching the second busbar, it is possible to easily form the first inclined portion and the second inclined portion in the second busbar, and contribute to cost reduction.

[10] According to the first aspect of the present invention, a housing configured to protect an outer periphery may be attached to one or more connectors of the plurality of connectors except the unused connector, and, instead of the housing, the cover may be attached in advance to the unused connector of the plurality of connectors. Consequently, the unused connector does not need the housing, so that it is possible to reduce the number of parts.

[11] An electric vehicle according to a second aspect of the present invention includes the connector structure according to the first aspect of the present invention. Consequently, it is possible to easily increase or decrease the number of connectors installed in the connector structure according to the number of accessories mounted on the electric vehicle, and easily cope with car models having a large number of accessories.

[12] According to the second aspect of the present invention, the connector structure may be mounted on a casing of a power converting device or a battery. By directly mounting the connector structure on the power converting device or the battery, it is possible to reduce the number of parts. It is possible to use a common connector shape between different car models, and use a common mounting point for a high voltage casing, too. As a result, it is possible to reduce man-hours of a high voltage casing design.

[13] According to the second aspect of the present invention, the connector structure may be arranged on a rear surface of the power converting device in a vehicle longitudinal direction. The connector structure is connected with a plurality of high voltage connectors. Even when frontal collision occurs, by arranging the connector structure on the rear surface of the power converting device, it is possible to effectively prevent fracture of the connector structure and exposure of a high voltage portion due to detachment of the fitted connector, while reducing reinforcing members or the like.

According to the connector structure and the electric vehicle according to the present invention, even when various car models and specifications increase the number of components, it is not necessary to newly change a connector shape (the entire structure, the busbars, the fuses, etc.), and it is possible to reduce the design man-hours, and reduce manufacturing cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Embodiments of a connector structure and an electric vehicle according to the present invention will be described with reference to FIGS. 1 to 11C.

Figure 1:
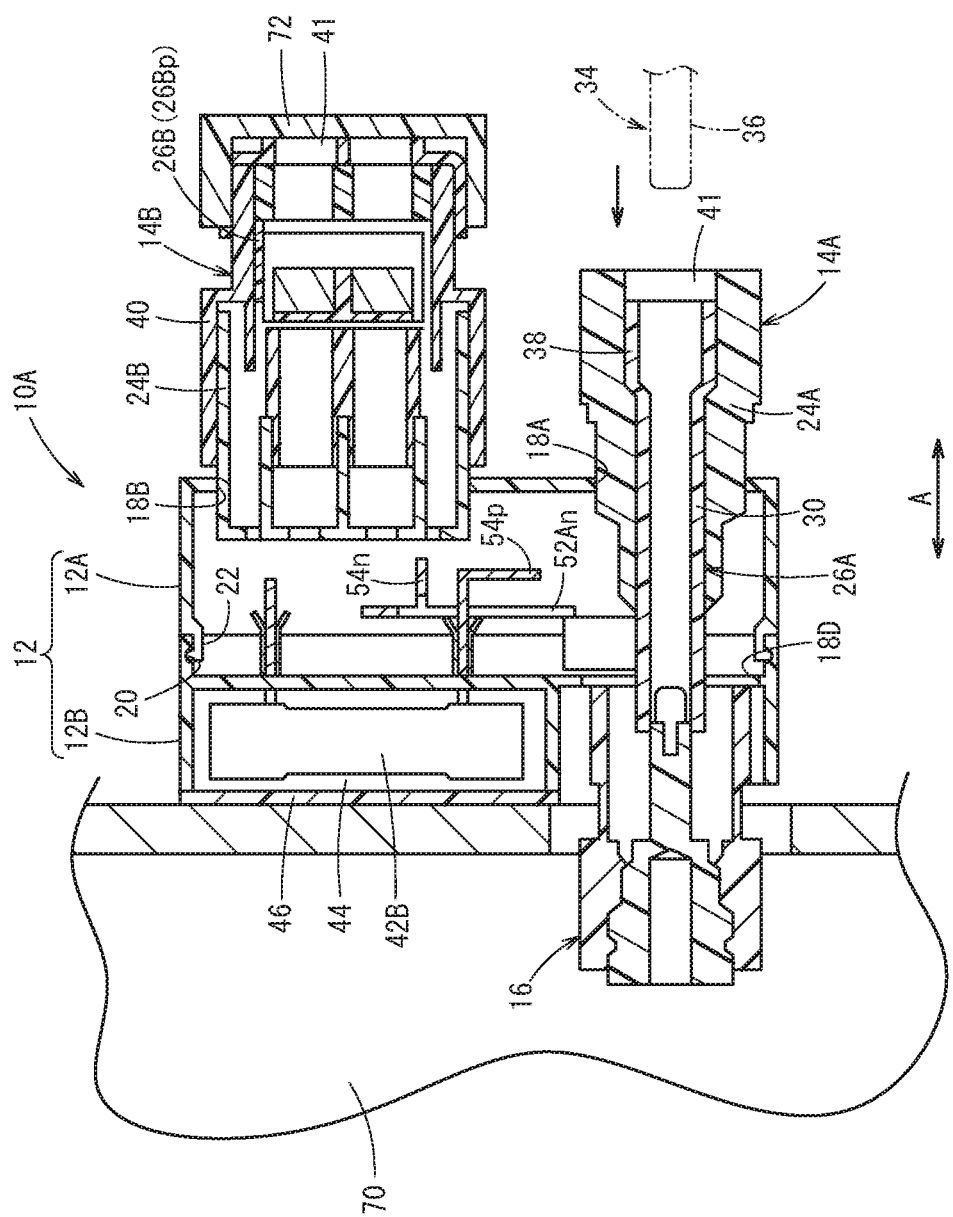
FIG. 1 is a cross-sectional view showing a structure of a connector structure (first connector structure) according to a first embodiment.
Figure 2:
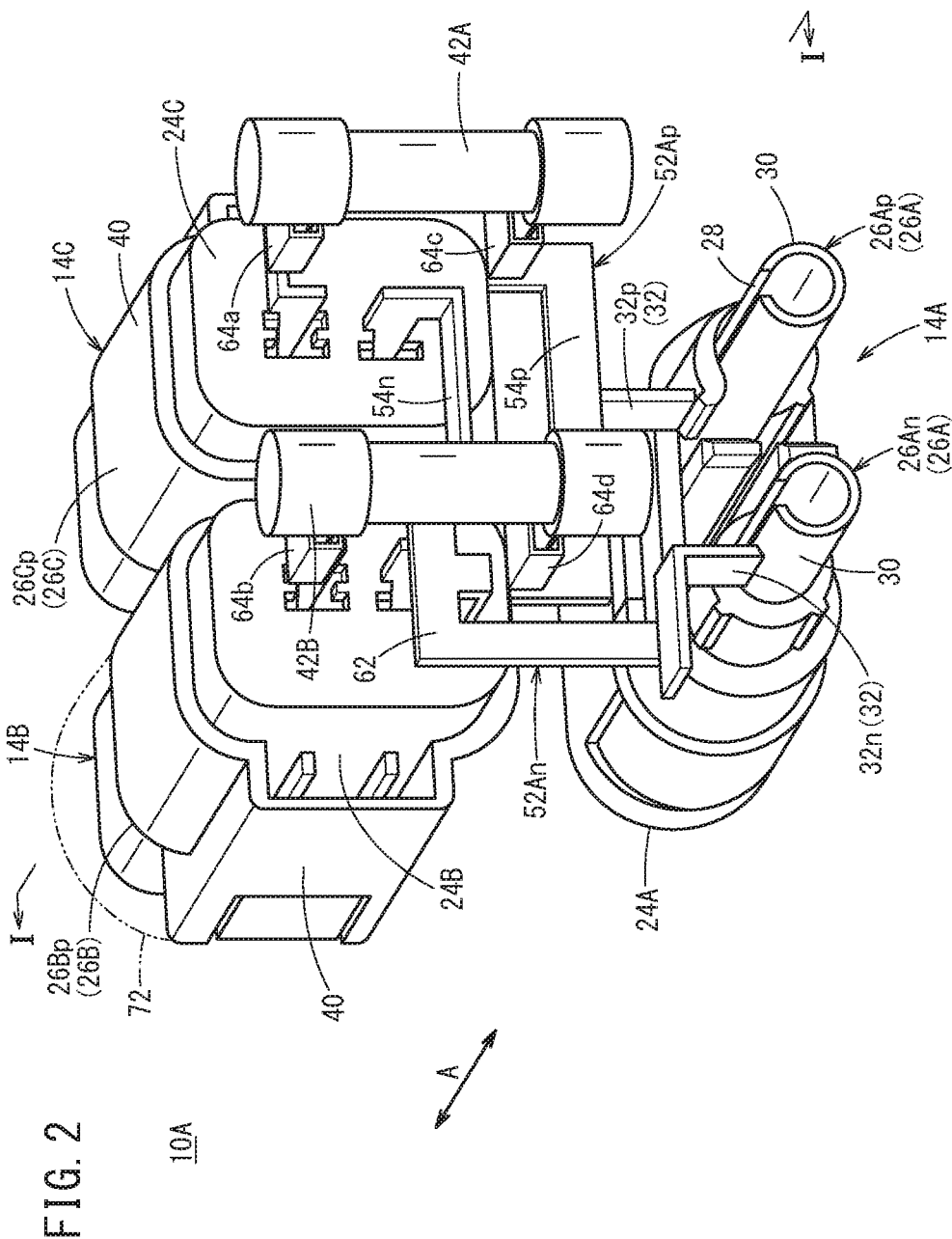
FIG. 2 is a view showing a rear side of the first connector structure, from which a connector casing is detached in particular.
Figure 3:
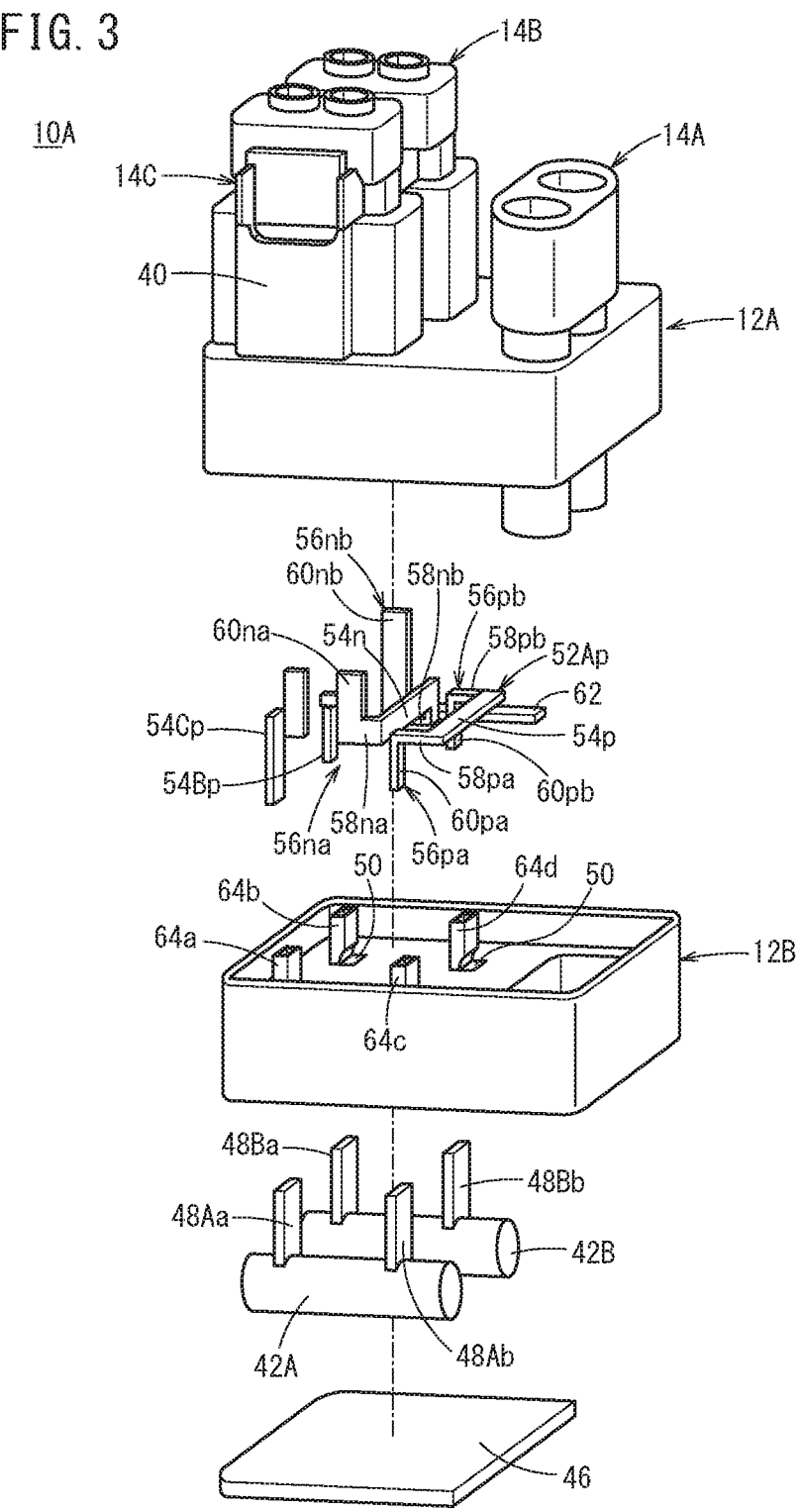
FIG. 3 is an exploded perspective view of the first connector structure.

FIG. 1 is a cross-sectional view (a cross-sectional view on a I-I line in FIG. 2) showing a connector structure (referred to as a first connector structure 10A below) according to a first embodiment. FIG. 2 is a view showing a rear side of the first connector structure 10A from which a connector casing 12 described below is detached in particular. FIG. 3 is an exploded perspective view of the first connector structure 10A.

This first connector structure 10A is a connector structure that is installed in an electric vehicle 100 such as a hybrid vehicle, a plug-in hybrid vehicle, an electric automobile, or a fuel-cell vehicle, and supplies power to high voltage accessories (components). The accessories include, for example, a water heater, an A/C electric compressor, a charger provided to a PHEV, a quick charger, and a non-contact charging rectifier.

More specifically, the first connector structure 10A includes the connector casing 12 whose outer shape is made of, for example, a resin, three mounted side connectors (a first mounted side connector 14A to a third mounted side connector 14C) that are mounted on the connector casing 12, and a high voltage connection portion 16 that is connected with a high voltage electric wire from an unillustrated power converting device (PCU) or a battery.

The connector casing 12 is formed in, for example, a cuboid shape. A first insertion port 18A, a second insertion port 18B and a third insertion port (not illustrated) are formed on, for example, a front surface that faces toward a rear side of the electric vehicle 100, and allow the first mounted side connector 14A, the second mounted side connector 14B, and the third mounted side connector 14C to be mounted thereon. A fourth insertion port 18D is formed on a rear surface that faces toward a front side of the electric vehicle 100, and allows the high voltage connection portion 16 to be mounted thereon.

The first mounted side connector 14A to the third mounted side connector 14C according to the inventive example are arranged facing toward the rear side of the electric vehicle 100, but may be arranged on an upper or lower surface or a side surface (a surface in a height direction or a surface in a width direction of the electric vehicle 100) of the connector casing 12. The number of mounted side connectors may be two or more yet is desirably three or more.

The connector casing 12 can be separated into two in a connector mounting direction (longitudinal direction of the electric vehicle 100: directions indicated by arrow A in FIGS. 1 and 2), i.e., can be separated into a first casing 12A on a front surface side and a second casing 12B on a rear surface side. That is, the first casing 12A and the second casing 12B are detachable in the mounting direction. This attaching/detaching mechanism includes, for example, a plurality of engagement recess portions 20 that are formed on an end surface (an end surface facing toward the first casing 12A) of the second casing 12B, and an engagement protrusion 22 that is formed on the end surface (an end surface facing toward the second casing 12B) of the first casing 12A and is inserted in the engagement recess portions 20.

When the first casing 12A and the second casing 12B are separated, a portion of the side surface of the first casing 12A near the end surface is inwardly pressed, and thereby the engagement protrusion 22 is separated from the engagement recess portions 20. Consequently, it is possible to easily separate the first casing 12A from the second casing 12B or separate the second casing 12B from the first casing 12A. On the other hand, the end surface of the first casing 12A and the end surface of the second casing 12B face and press each other in a direction to come close to each other, and thereby the engagement protrusion 22 of the first casing 12A fit in the engagement recess portions 20 of the second casing 12B. Consequently, it is possible to easily attach the first casing 12A to the second casing 12B or attach the second casing 12B to the first casing 12A.

The first mounted side connector 14A includes two first support members 24A in cylindrical shapes that are attached to the first insertion port 18A of the connector casing 12 and extend in the longitudinal direction of the electric vehicle 100, and a first electrode conductive member 26A (a first positive electrode conductive member 26Ap and a first negative electrode conductive member 26An) that is inserted in each first support member 24A.

Figure 4:
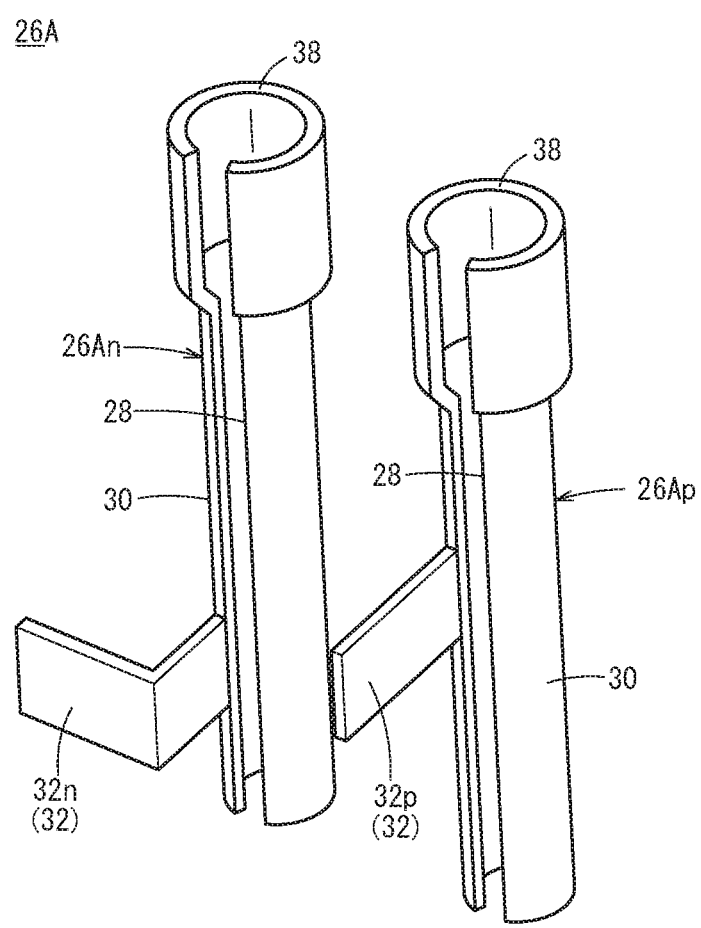
FIG. 4 is a perspective view showing first electrode conductive members (a first positive electrode conductive member and a first negative electrode conductive member)

As shown in FIG. 4, the first electrode conductive member 26A (the first positive electrode conductive member 26Ap and the first negative electrode conductive member 26An) includes a cylindrical portion 30 that has a cylindrical shape extending in the mounting direction and includes a cutout 28 extending in the mounting direction, and an extended portion 32 (a positive electrode side extended portion 32$p$ and a negative electrode side extended portion 32$n$) that extends outwardly from the portion of the cutout 28 in the cylindrical portion 30. The positive electrode side extended portion 32$p$ has a rectangular shape. The negative electrode side extended portion 32$n$ has an L shape. The cylindrical portion 30 includes at the end portion an expanded portion 38 that expands in a direction perpendicular to the mounting direction and in which an end portion of an electrode conductive portion 36 (indicated by a two-dot-dashed line in FIG. 1) of a mounting side connector 34 is inserted.

The second mounted side connector 14B includes a second support member 24B that is attached to the second insertion port 18B of the connector casing 12, extends in the longitudinal direction of the electric vehicle 100, and is made of, for example, a resin, a second electrode conductive member 26B (second positive electrode conductive member 26Bp) that is attached to the second support member 24B, a second positive electrode conductive plate 54Bp (see FIG. 3) that extends from the second positive electrode conductive member 26Bp in a depth direction, and a housing 40 that is attached to a periphery of the second support member 24B and is made of, for example, a resin. A rear end portion of the second positive electrode conductive plate 54Bp extends to the second casing 12B.

The third mounted side connector 14C also employs the same configuration as that of the above second mounted side connector 14B. The third mounted side connector 14C includes a third support member 24C that is attached to the third insertion port (not shown) of the connector casing 12 and is made of, for example, a resin, a third electrode conductive member 26C (third positive electrode conductive member 26Cp) that is an inter-connector conductive member attached in the longitudinal direction of the third support member 24C, a third positive electrode conductive plate 54Cp (see FIG. 3) that extends from the third positive electrode conductive member 26Cp in the depth direction, and a housing 40 that is attached to a periphery of the third support member 24C and is made of, for example, a resin. A rear end portion of the third positive electrode conductive plate 54Cp also extends to the second casing 12B.

An opening 41 is formed at each distal end portion of the above first support member 24A to third support member 24C to allow the mounting side connector 34 to be inserted in the depth direction.

Meanwhile, the second casing 12B includes at a rear portion a fuse housing portion 44 (see FIG. 1) that houses a first fuse 42A and a second fuse 42B. A rear portion cover 46 is detachably mounted on a rear portion of the fuse housing portion 44. Consequently, by detaching the rear portion cover 46 of the fuse housing portion 44, it is possible to easily house the first fuse 42A and the second fuse 42B in the fuse housing portion 44.

Four through-holes 50 (see FIG. 3) are formed at a front portion of the fuse housing portion 44 (a boundary with respect to the first casing 12A), and communicate with the first casing 12A and allow insertion of each of a pair of lead terminals 48Aa, 48Ab of the first fuse 42A and a pair of lead terminals 48Ba, 48Bb of the second fuse 42B.

That is, when the first fuse 42A and the second fuse 42B are housed in the fuse housing portion 44, the pair of lead terminals 48Aa, 48Ab of the first fuse 42A and the pair of lead terminals 48Ba, 48Bb of the second fuse 42B face toward the first casing 12A, and the pair of lead terminals 48Aa, 48Ab of the first fuse 42A and the pair of lead terminals 48Ba, 48Bb of the second fuse 42B are inserted in the corresponding through-holes 50. Consequently, it is possible to house the first fuse 42A and the second fuse 42B in the fuse housing portion 44.

As shown in FIG. 2, the first positive electrode conductive member 26Ap of the above first mounted side connector 14A includes a first positive electrode conductive plate 52Ap that is formed integrally with the positive electrode side extended portion 32$p$. The first positive electrode conductive plate 52Ap includes a positive electrode side elongated portion 54$p$ that is provided for the positive electrode side extended portion 32$p$. This positive electrode side elongated portion 54$p$ includes one end portion that faces toward the first fuse 42A, and the other end portion that faces toward the second fuse 42B. As shown in FIG. 3, the positive electrode side elongated portion 54$p$ includes a first positive electrode side bent portion 56$pa$ in an L shape formed integrally with the one end portion. The positive electrode side elongated portion 54$p$ includes a second positive electrode side bent portion 56$pb$ in an L shape formed integrally with the other end portion. The first positive electrode side bent portion 56$pa$ includes a first positive electrode side raised portion 58$pa$ that is raised upward from the one end portion of the positive electrode side elongated portion 54$p$, and a first positive electrode side connection portion 60$pa$ that extends backward from the first positive electrode side raised portion 58$pa$. Similarly, the second positive electrode side bent portion 56$pb$ includes a second positive electrode side raised portion 58$pb$ that is raised upward from the other end portion of the positive electrode side elongated portion 54$p$, and a second positive electrode side connection portion 60$pb$ that extends backward from the second positive electrode side raised portion 58$pb$.

As shown in FIG. 2, the first negative electrode conductive member 26An of the first mounted side connector 14A includes a first negative electrode conductive plate 52An formed integrally with the negative electrode side extended portion 32n in the L shape. The first negative electrode conductive plate 52An includes an L-shaped conductive portion 62 that is raised upward, and a negative electrode side elongated portion 54n that is formed integrally with the L-shaped conductive portion 62. The negative electrode side elongated portion 54n includes a first negative electrode side bent portion 56na in an L shape formed integrally with one end portion. The negative electrode side elongated portion 54n includes a second negative electrode side bent portion 56nb in an L shape formed integrally with the other end portion. The first negative electrode side bent portion 56na includes a first negative electrode side raised portion 58na that is raised upward from the one end portion of the negative electrode side elongated portion 54n, and a first negative electrode side connection portion 60na that extends backward from the first negative electrode side raised portion 58na. Similarly, the second negative electrode side bent portion 56nb includes a second negative electrode side raised portion 58nb that is raised upward from the other end portion of the negative electrode side elongated portion 54n, and a second negative electrode side connection portion 60nb that extends backward from the second negative electrode side raised portion 58nb. An end portion of the first negative electrode side connection portion 60na is inserted in the third mounted side connector 14C. An end portion of the second negative electrode side connection portion 60nb is inserted in the second mounted side connector 14B.

Bonding terminals 64a to 64d made of, for example, metal are mounted on a surface of the second casing 12B on a side of the first casing 12A to meet each through-hole 50. When, for example, the lead terminal 48Aa of the first fuse 42A and the third positive electrode conductive plate 54Cp of the third mounted side connector 14C are inserted in the bonding terminal 64a from both of directions, the bonding terminal 64a electrically connects these terminals. The same applies to the other bonding terminals 64b to 64d.

As shown in FIG. 1, this first connector structure 10A is mounted on a casing 70 of a power converting unit (PCU) or a battery installed in the electric vehicle 100. A high voltage electric wire (not shown) from the power converting device (PCU) or the battery is connected with the high voltage connection portion 16. When the first connector structure 10A is mounted on the power converting device, the first connector structure 10A is preferably arranged on a rear surface of the power converting device in the vehicle longitudinal direction.

In particular, in the present embodiment, a cover 72 (see FIGS. 1 and 2) is mounted and closes the opening 41 of the mounted side connector that is not connected with the mounting side connector of a component among the plurality of mounted side connectors, i.e., the unused mounted side connector. FIGS. 1 and 2 show examples where the cover 72 for closing the opening 41 is mounted on a distal end portion of the second mounted side connector 14B. FIG. 2 shows the cover 72 as a two-dot-dashed line. The cover 72 is not limited to a cover that covers the opening 41 as in the inventive example, and may adopt, for example, a structure that inserts a grommet in the mounted side connector to close.

Figure 5:
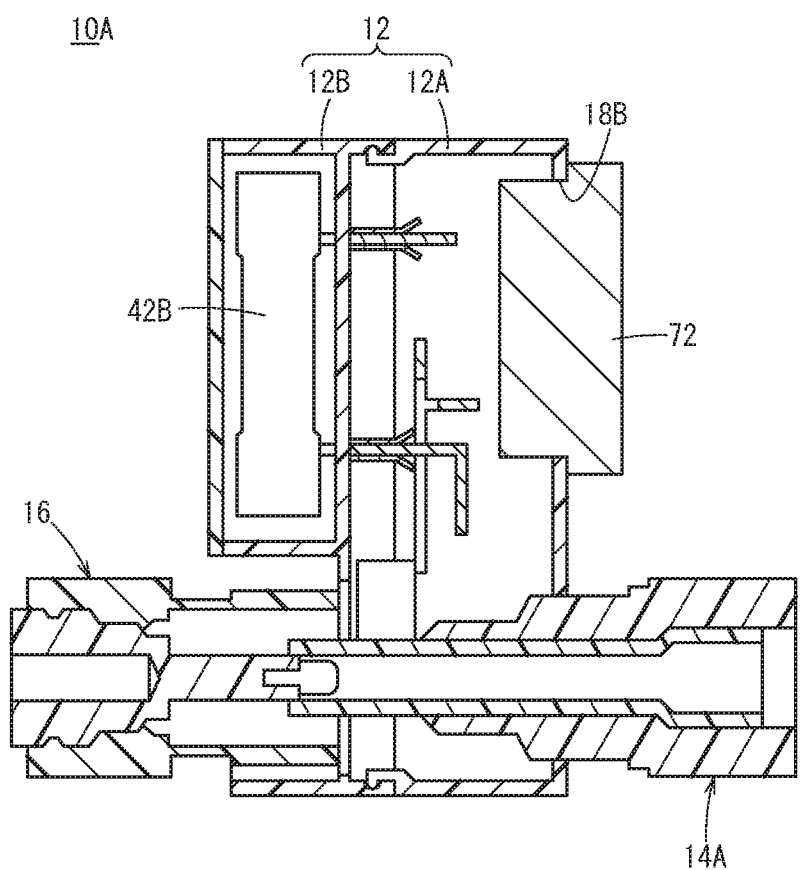
FIG. 5 is a cross-sectional view showing an example where, instead of a housing, a cover is mounted on an unused connector.

As shown in FIG. 5, the housing 40 may not be arranged in advance for the unused connector (e.g., second mounted side connector 14B), and the cover 72 may be configured to directly close the second insertion port 18B. Consequently, the unused connector does not need the housing 40, so that it is possible to reduce the number of parts.

Next, an example of a procedure of assembling this first connector structure 10A will be described below. The following assembling procedure is only an example, and this first connector structure 10A may be assembled by other procedures.

First, for example, the second positive electrode conductive member 26Bp is mounted on the second mounted side connector 14B, and the third positive electrode conductive member 26Cp is mounted on the third mounted side connector 14C. Subsequently, the second mounted side connector 14B is attached to the second insertion port 18B of the first casing 12A, and the third mounted side connector 14C is attached to the third insertion port (not shown).

Next, the first positive electrode conductive member 26Ap and the first negative electrode conductive member 26An are inserted in the first support member 24A of the first mounted side connector 14A. Subsequently, the positive electrode side elongated portion 54p of the first positive electrode conductive plate 52Ap is electrically connected with the positive electrode side extended portion 32p of the first positive electrode conductive member 26Ap by welding or the like. The negative electrode side elongated portion 54n of the first negative electrode conductive plate 52An is electrically connected with the negative electrode side extended portion 32n of the first negative electrode conductive member 26An by welding or the like. The connector casing 12 can be separated into the first casing 12A and the second casing 12B, so that this operation can be easily performed.

Next, the four bonding terminals 64a to 64d are attached to the second casing 12B on a side facing the first casing 12A. Subsequently, by attaching the second casing 12B to the first casing 12A, the third positive electrode conductive plate 54Cp of the third mounted side connector 14C is inserted in the bonding terminal 64a. Further, the second positive electrode conductive plate 54Bp of the second mounted side connector 14B is inserted in the bonding terminal 64b. Furthermore, the first positive electrode side connection portion 60pa of the first positive electrode conductive plate 52Ap of the first mounted side connector 14A is inserted in the bonding terminal 64c. Still further, the second positive electrode side connection portion 60pb of the first mounted side connector 14A is inserted in the bonding terminal 64d.

Next, the first fuse 42A and the second fuse 42B are attached to the fuse housing portion 44 at a rear portion of the second casing 12B. In this case, the lead terminal 48Aa of the first fuse 42A is inserted in the bonding terminal 64a via the through-hole 50, and is electrically connected with the third positive electrode conductive plate 54Cp of the third mounted side connector 14C. The lead terminal 48Ab of the first fuse 42A is inserted in the bonding terminal 64c via the through-hole 50, and is electrically connected with the first positive electrode conductive plate 52Ap of the first mounted side connector 14A.

Similarly, the lead terminal 48Ba of the second fuse 42B is inserted in the bonding terminal 64b via the through-hole 50, and is electrically connected with the second positive electrode conductive plate 54Bp of the second mounted side connector 14B. The lead terminal 48Bb of the second fuse 42B is inserted in the bonding terminal 64d via the through-hole 50, and is electrically connected with the first positive electrode conductive plate 52Ap of the first mounted side connector 14A.

Then, the rear portion cover 46 is mounted on the rear portion of the second casing 12B, so that the first connector structure 10A is completed.

Next, a connector structure (referred to as a second connector structure 10B below) according to a second embodiment will be described with reference to FIG. 6.

Figure 6:
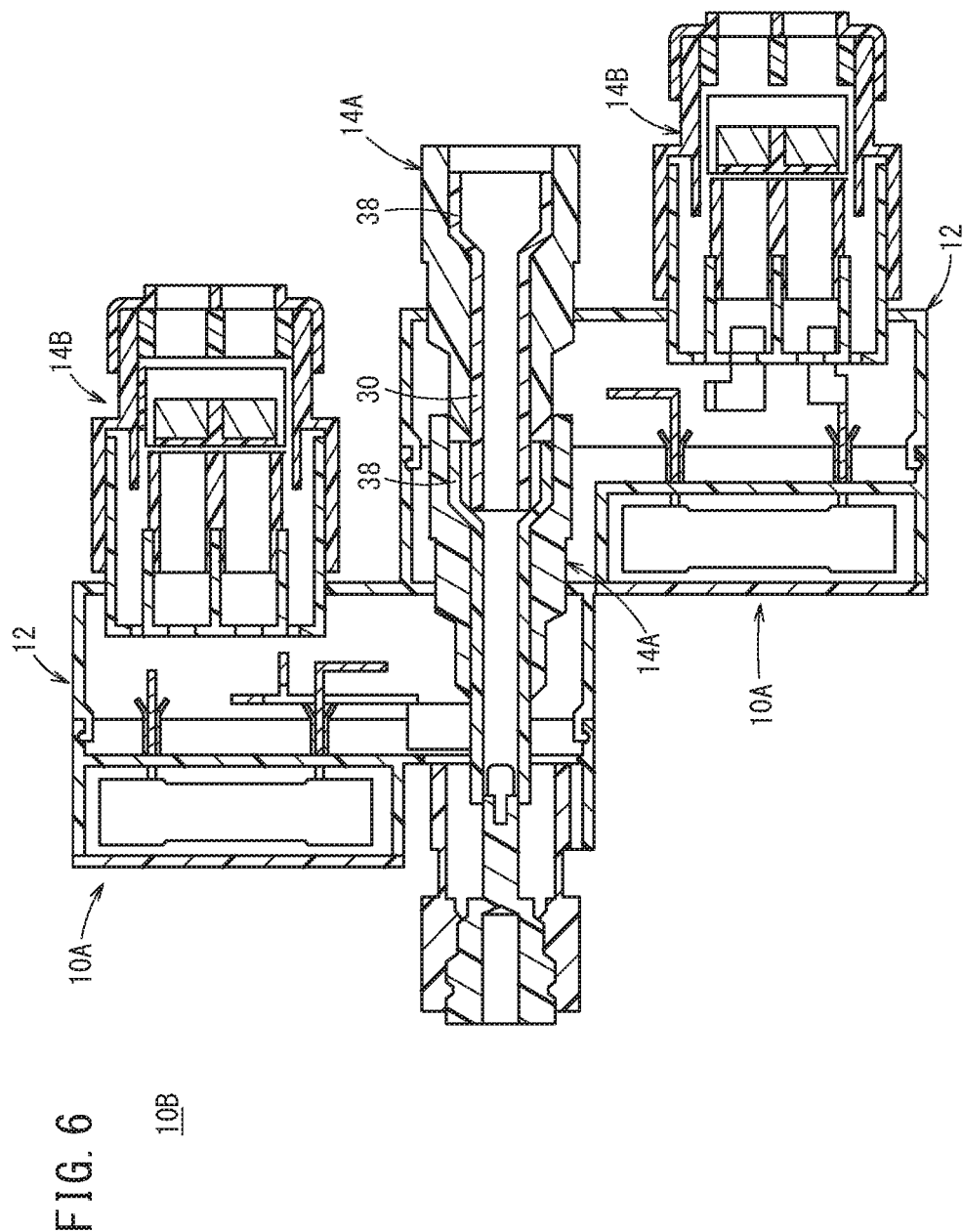
FIG. 6 is a cross-sectional view showing the structure of the connector structure (second connector structure) according to a second embodiment.

As shown in FIG. 6, the second connector structure 10B includes the two first connector structures (sub-connector structures) 10A. More specifically, in the expanded portion 38 of the cylindrical portion 30 of the first connector structure 10A, an end portion opposite to the expanded portion 38 of the cylindrical portion 30 of another first connector structure 10A is inserted for electrical connection.

In this case, one first connector structure 10A can include three mounted side connectors. However, this second connector structure 10B can include two more mounted side connectors. That is, the second connector structure 10B can include the five mounted side connectors.

Consequently, by sequentially connecting the end portion opposite to the expanded portion 38 of the cylindrical portion 30 of another first connector structure 10A to the expanded portion 38 of each first connector structure 10A, it is possible to increase the number of mounted side connectors by two at a time.

FIG. 6 shows an example where the number of the first connector structures 10A is two-dimensionally increased. However, the number of the first connector structures 10A may be three-dimensionally increased.

Comparison between the electric vehicle 100 according to the inventive example and an electric vehicle 200 according to a comparative example, and comparison between power distribution branch structures will be described with reference to FIGS. 7 and 8.

Figure 7:
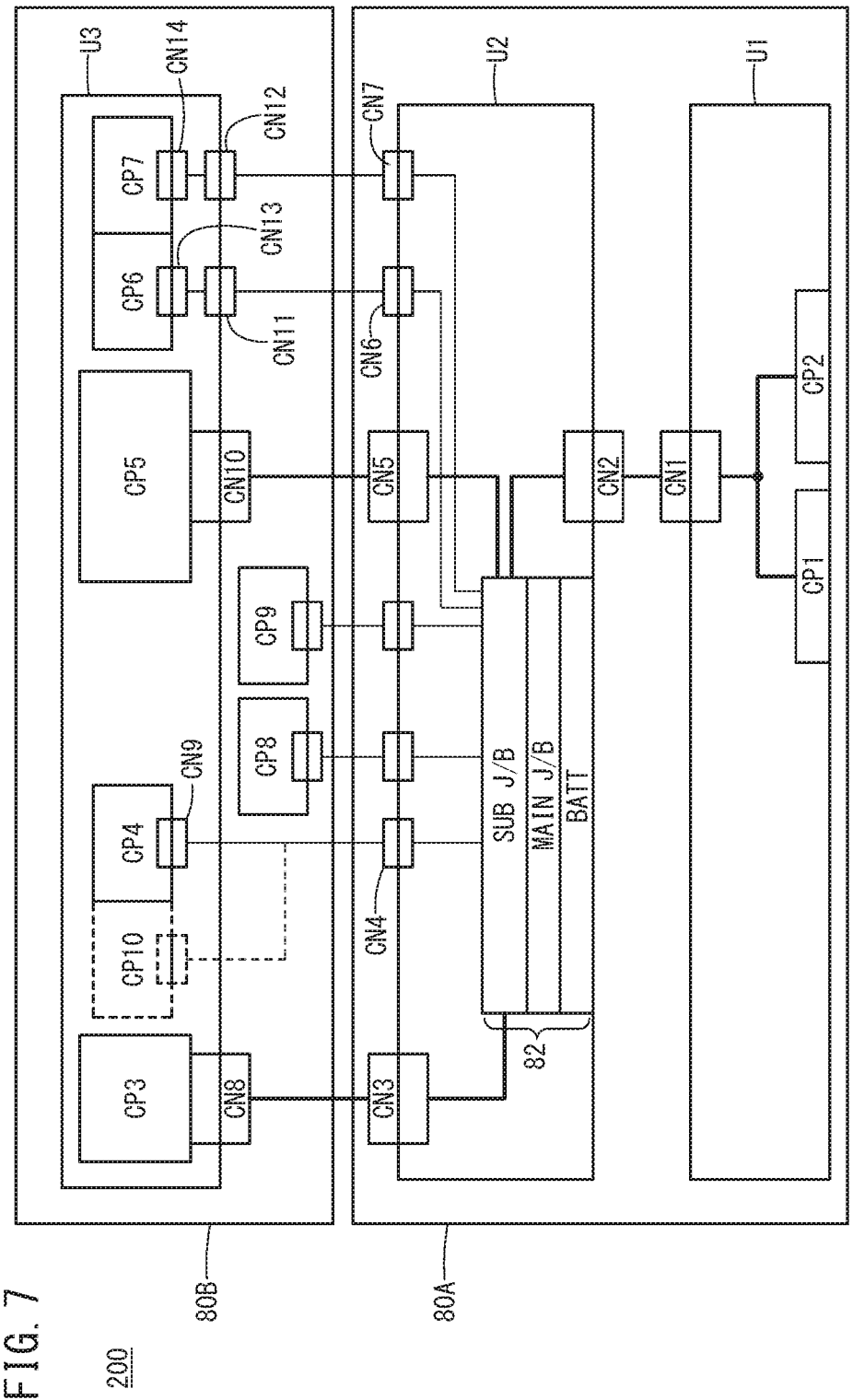
FIG. 7 is an explanatory view showing a power distribution branch structure of an electric vehicle according to a comparative example.

As shown in FIG. 7, in the power distribution branch structure of the electric vehicle 200 according to the comparative example, a first connector CN1 and a second connector CN2 are connected between a first unit U1 and a second unit U2 installed in a first region 80A such as an interior of a vehicle compartment or a region below a floor. For example, two accessories (a first accessory CP1 and a second accessory CP2) are installed in the first unit U1. For example, a high voltage battery device 82 is installed in the second unit U2. The first accessory CP1 and the second accessory CP2 are PDUs (power drive units). The high voltage battery device 82 includes a battery (BATT), a main junction block (MAIN J/B) and a sub junction block (SUB J/B).

For example, there are 12 connectors CN3 to CN14 connected between the second unit U2 and a third unit U3 installed in a second region 80B such as an engine room of the electric vehicle 200. For example, five accessories (a third accessory CP3 to a seventh accessory CP7) are installed in the third unit U3.

The third accessory CP3 is a DC quick charging/power feeding board. The fourth accessory CP4 is an AC charger. The fifth accessory CP5 is a PCU (Power Control Unit (Power Converting Device)). The sixth accessory CP6 is a water heater. The seventh accessory CP7 is an electric compressor.

The high voltage battery device 82 and the third accessory CP3 are connected via the third connector CN3 and the eighth connector CN8. The high voltage battery device 82 and the fourth accessory CP4 are connected via the fourth connector CN4 and the ninth connector CN9. The high voltage battery device 82 and the fifth accessory CP5 are connected via the fifth connector CN5 and the tenth connector CN10. The high voltage battery device 82 and the sixth accessory CP6 are connected via the sixth connector CN6, the eleventh connector CN11 and the thirteenth connector CN13. The high voltage battery device 82 and the seventh accessory CP7 are connected via the seventh connector CN7, the twelfth connector CN12 and the fourteenth connector CN14.

The power distribution branch structure of the electric vehicle 200 according to the comparative example distributes power from the high voltage battery device 82 of the electric vehicle 200 to the first accessory CP1 through the seventh accessory CP7 via the 14 connectors CN1 to CN14. Therefore, high voltage power distribution is complicated. Moreover, the second unit U2 needs to supply power from the high voltage battery device 82 to three or more connectors (the second connector CN2, the third connector CN3, the fourth connector CN4, etc.). Therefore, the sub junction block (SUB J/B) is necessary in addition to the main junction block (MAIN J/B), and therefore the high voltage battery device 82 becomes large.

There are multiple routes of power distribution from the high voltage battery device 82. Therefore, the third accessory CP3 (DC quick charging/power feeding junction block) for quick charging/power feeding is necessary. Therefore, the power distribution branch structure becomes complicated and larger.

Also in future, it is possible that an AC indoor 100 V power feeder (eighth accessory CP8), an AC non-contact charging rectifier (ninth accessory CP9), etc. will be further added in the engine room 80B. In this case, twice connectors as the number of accessories to be increased need to be connected. Therefore, it is concerned that a wiring layout also becomes more complicated, and that an installation space will reach a limit.

In addition to an AC charger (fourth accessory CP4), as necessary, it is assumed that an AC bidirectional charger (tenth accessory CP10) may be installed, and that one of the fourth accessory CP4 and the tenth accessory CP10 may be selected. However, the wiring layout is originally complicated. Therefore, even in a case of an identical car body, only one of the fourth accessory CP4 and the tenth accessory CP10 is selected and installed according to a specification, and it is concerned that development efficiency is also lowered.

Figure 8:
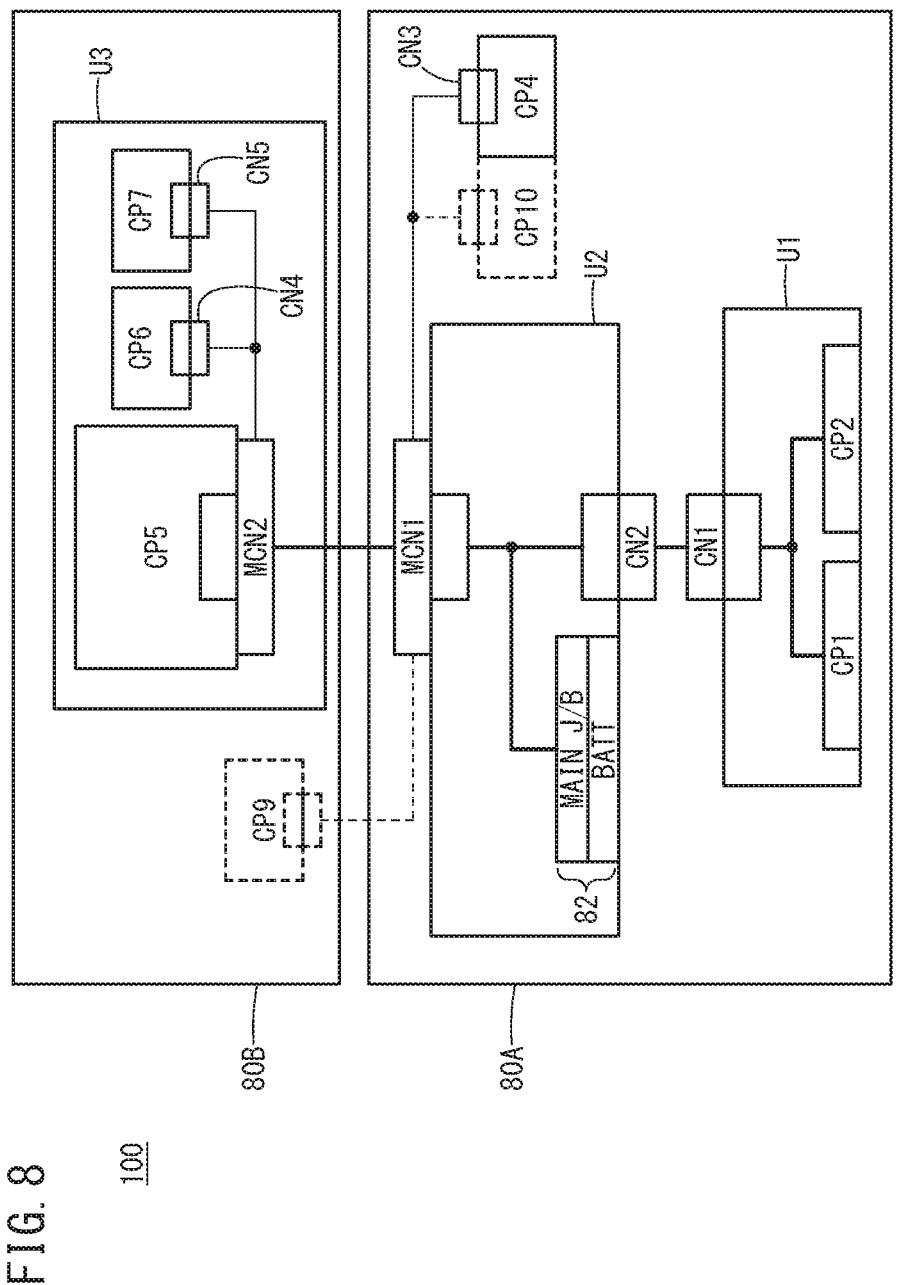
FIG. 8 is an explanatory view showing a power distribution branch structure of an electric vehicle according to an inventive example.

By contrast with this, as shown in FIG. 8, in the power distribution branch structure of the electric vehicle 100 according to the inventive example, the high voltage battery device 82 in the first region 80A and the fifth accessory CP5 (PCU) in the second region 80B are connected via a first multi connector MCN1 and a second multi connector MCN2 of the first connector structure 10A.

The first multi connector MCN1 is selectively connected with the fourth accessory CP4 (AC charger) or the tenth accessory CP10 (AC bidirectional charger). The second multi connector MCN2 is further connected with the sixth accessory CP6 (water heater) and the seventh accessory CP7 (electric compressor).

In this case, the high voltage connection portion 16 of the first connector structure 10A in the first multi connector MCN1 is connected with a high voltage electric wire from the high voltage battery device 82. For example, the first mounted side connector 14A is connected with a high voltage electric wire connected with the fifth accessory CP5. For example, the third mounted side connector 14C is connected with the third connector CN3 of the fourth accessory CP4. The second mounted side connector 14B is not used, and therefore is attached with the cover 72.

Meanwhile, the high voltage connection portion 16 of the first connector structure 10A in the second multi connector MCN2 is connected with a high voltage electric wire from the first multi connector MCN1. For example, the first mounted side connector 14A is connected with the mounted side connector of the fifth accessory CP5. For example, the second mounted side connector 14B is connected with the fourth connector CN4 of the sixth accessory CP6. The third mounted side connector 14C is connected with the fifth connector CN5 of the seventh accessory CP7.

Thus, the power distribution branch structure of the electric vehicle 100 according to the embodiment can integrate wires connected with the high voltage battery device 82. Consequently, it is possible to increase the degree of freedom of the wiring layout. The sub junction block (SUB J/B) does not need to be installed in the high voltage battery device 82, so that it is possible to miniaturize the high voltage battery device 82. The DC quick charging/power feeding junction block does not need to be mounted, so that it is possible to simplify and miniaturize the power distribution branch structure.

When the AC non-contact charging rectifier (ninth accessory CP9) is additionally installed in the engine room 80B in future, it is possible to connect the AC non-contact charging rectifier with the second mounted side connector 14B of the unused first multi connector MCN1, and it is not necessary to install a new connector. When the number of accessories to be additionally installed is larger, the first multi connector MCN1 and the second multi connector MCN2 may be composed by the second connector structure 10B, and it is not necessary to increase a connector in response to additional installation of accessories.

That is, even when the number of accessories to be additionally installed is larger, it is possible to exhibit an effect of improving the degree of freedom of the wiring layout, and simplifying and miniaturizing the power distribution branch structure. Hence, for example, in addition to the AC charger (fourth accessory CP4), the AC bidirectional charger (tenth accessory CP10) can be installed. Consequently, it is not necessary that only one of the fourth accessory CP4 and the tenth accessory CP10 is installed according to a specification. As a result, it is possible to provide identical equipment to an identical car body, and enhance development efficiency.

FIG. 8 shows a structure that the first multi connector MCN1 and the second multi connector MCN2 are mounted on casings of the high voltage battery device 82 and the fifth accessory CP5 (PCU), etc. However, the first multi connector MCN1 and the second multi connector MCN2 may not be mounted on the casings. For example, the power distribution branch structure may include the first multi connector MCN1 and the second multi connector MCN2 between cables.

Figure 9A:
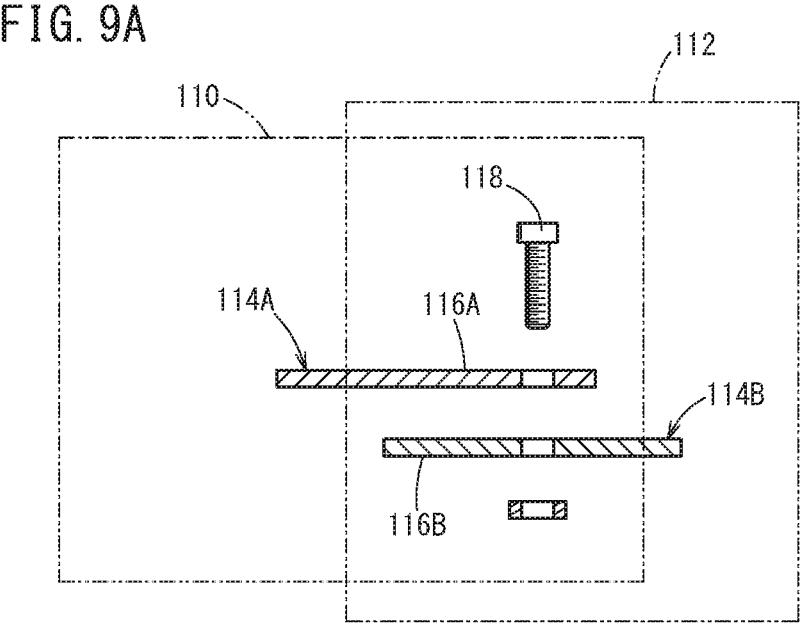
FIGS. 9A and 9B are explanatory views showing a normal method for electrically connecting a mounting side connector and a mounted side connector.
Figure 9B:
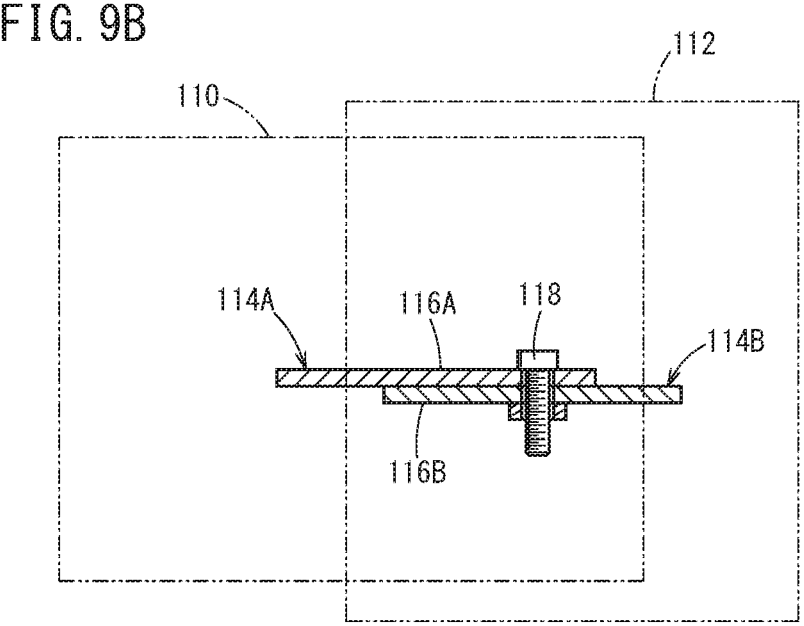

Incidentally, as schematically shown in FIGS. 9A and 9B, a mounting side connector 110 and a mounted side connector 112 are electrically connected by fastening a first busbar 116A of a first electrode conductive portion 114A in the mounting side connector 110, and a second busbar 116B of the second electrode conductive portion 114B in the mounted side connector 112 by using, for example, a bolt 118. In this case, the number of parts increases, and a space for fastening the bolt needs to be secured. The degree of design freedom is limited, and cost reduction is also limited.

Figure 10A:
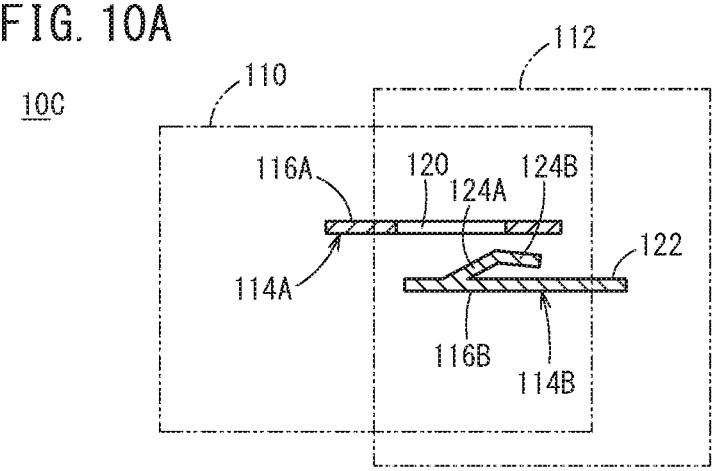
FIGS. 10A to 10C are explanatory views showing the method for electrically connecting the mounting side connector and the mounted side connector of the connector structure (third connector structure) according to a third embodiment.
Figure 10B:
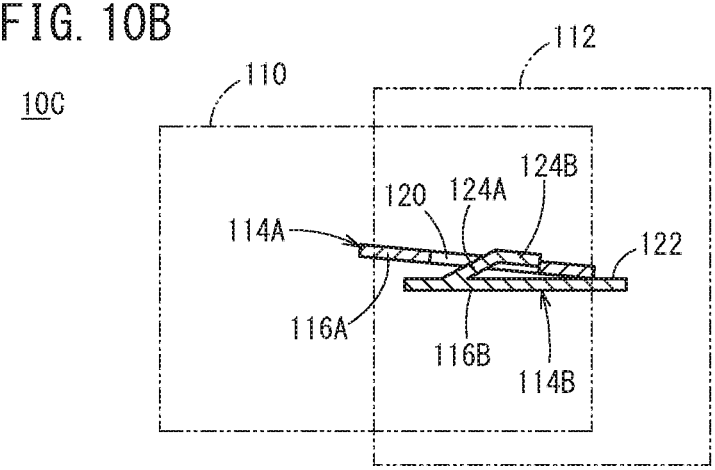
Figure 10C:
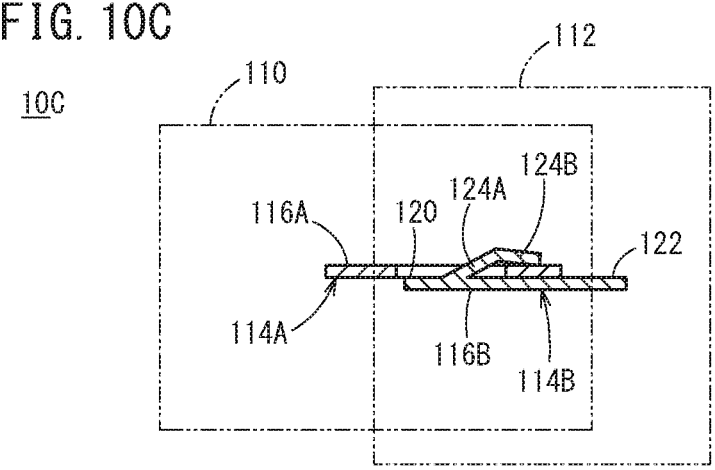

As schematically shown in FIGS. 10A to 10C, a connector structure 10C (referred to as a third connector structure 10C) according to a third embodiment employs different configurations of electrode conductive portions of the mounting side connector 110 and the mounted side connector 112 from the example in FIGS. 9A and 9B. The mounting side connector 110 corresponds to the above mounting side connector 34, and the mounted side connector 112 corresponds to the above first mounted side connector 14A or the like.

That is, the mounting side connector 110 includes the first busbar 116A that constitutes the first electrode conductive portion 114A and extends in the mounting direction, and a hole 120 that is formed in the first busbar 116A.

The mounted side connector 112 includes the second busbar 116B that constitutes the second electrode conductive portion 114B and extends in the mounting direction, a first inclined portion 124A that is raised in one direction from a plate surface 122 of the second busbar 116B, and a second inclined portion 124B that extends from a top portion of the first inclined portion 124A toward the plate surface 122 of the second busbar 116B. That is, the first inclined portion 124A and the second inclined portion 124B are formed integrally with the second busbar 116B.

When the mounting side connector 110 is attached to the mounted side connector 112, the plate surface 122 of the second busbar 116B and the second inclined portion 124B sandwich and hold the first busbar 116A.

That is, as shown in FIG. 10A, for example, the mounting side connector 110 is pressed against the mounted side connector 112. In this case, for example, the mounting side connector 110 is pressed against the mounted side connector 112 such that the hole 120 of the first busbar 116A and the first inclined portion 124A and the second inclined portion 124B of the second busbar 116B face toward each other.

Subsequently, as shown in FIG. 10B, the mounting side connector 110 is moved downward, for example, to insert a top portion of the first inclined portion 124A of the second busbar 116B into the hole 120 of the first busbar 116A.

Subsequently, when the mounting side connector 110 moves in a direction away from the mounted side connector 112 as shown in FIG. 10C, a lower surface of the first busbar 116A moves along the plate surface 122 of the second busbar 116B, so that the first busbar 116A and the second busbar 116B are assembled. In this case, the second inclined portion 124B of the second busbar 116B is bent obliquely downward. Therefore, a distal end portion of the second inclined portion 124B and the plate surface 122 of the second busbar 116B sandwich the first busbar 116A. Consequently, it is possible to increase a contact area of the first busbar 116A and the second busbar 116B, so that the first busbar 116A and the second busbar 116B are electrically conducted.

Similar to the above, when the mounting side connector 110 is detached from the mounted side connector 112, the mounting side connector 110 is pressed against the mounted side connector 112 to release a sandwiching relation between the first busbar 116A and the second inclined portion 124B and the plate surface 122 of the second busbar 116B. Subsequently, by further moving the mounting side connector 110 and the mounted side connector 112 in the direction to move away from each other, it is possible to detach the mounting side connector 110 from the mounted side connector 112. In this case, an inclined surface of the second inclined portion 124B functions as a guide surface in a detaching direction of the first busbar 116A. Consequently, it is possible to easily detach the mounting side connector 110 from the mounted side connector 112.

In the present embodiment, the hole 120 is formed in the first busbar 116A of the mounting side connector 110, and the first inclined portion 124A and the second inclined portion 124B are formed in the second busbar 116B of the mounted side connector 112. However, there may be a structure including the first inclined portion 124A and the second inclined portion 124B formed in the first busbar 116A of the mounting side connector 110, and the hole 120 formed in the second busbar 116B of the mounted side connector 112.

Figure 11A:
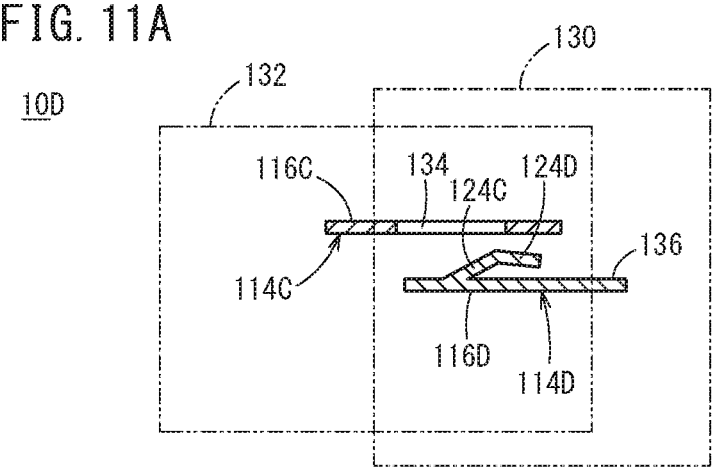
FIGS. 11A to 11C are explanatory views showing the method for electrically connecting the casing and the mounted side connector in the connector structure (fourth connector structure) according to a fourth embodiment.
Figure 11B:
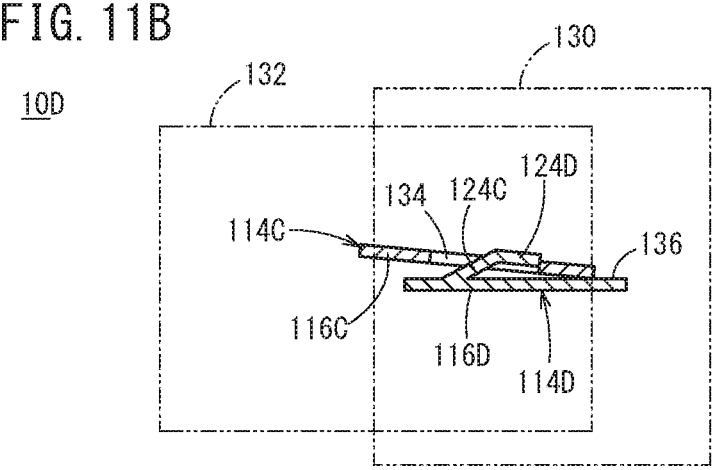
Figure 11C:
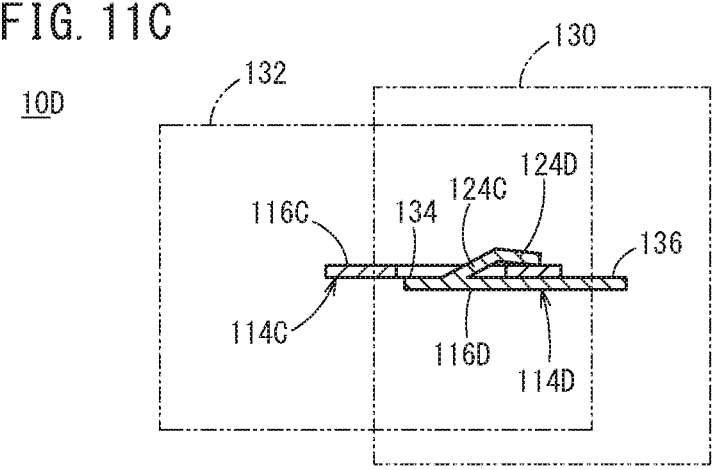

Next, a connector structure (referred to as a fourth connector structure 10D) according to a fourth embodiment will be described with reference to FIGS. 11A to 11C.

This fourth connector structure 10D is applied to a case where a mounted side connector 132 is attached to and detached from a casing 130. The casing 130 corresponds to the above casing mounting side connector 34, and the mounted side connector 132 corresponds to the above first mounted side connector 14A or the like.

That is, the mounted side connector 132 includes a third busbar 116C that constitutes a third electrode conductive portion 114C and extends in the mounting direction, and a hole 134 that is formed in the third busbar 116C.

The casing 130 includes a fourth busbar 116D that constitutes a fourth electrode conductive portion 114D and extends in the mounting direction, a third inclined portion 124C that is raised in one direction from a plate surface 136 of the fourth busbar 116D, and a fourth inclined portion 124D that extends from a top portion of the third inclined portion 124C toward the plate surface 136 of the fourth busbar 116D. That is, the third inclined portion 124C and the fourth inclined portion 124D are formed integrally with the fourth busbar 116D.

When the mounted side connector 132 is mounted on the casing 130, the plate surface 136 of the fourth busbar 116D and the fourth inclined portion 124D sandwich and hold the third busbar 116C.

That is, similar to the case of the above third connector structure 10C, by pressing the mounted side connector 132 against the casing 130 and moving the mounted side connector 132 and the casing 130 in a direction away from each other, it is possible to connect the mounted side connector 132 with the casing 130 firmly. When the mounted side connector 132 is detached from the casing 130, by pressing the mounted side connector 132 against the casing 130 and moving the mounted side connector 132 and the casing 130 in the direction away from each other similar to the above, it is possible to easily detach the mounted side connector 132 from the casing 130.

In the present embodiment, the hole 134 is formed in the third busbar 116C of the mounted side connector 132, and the third inclined portion 124C and the fourth inclined portion 124D are formed in the fourth busbar 116D of the casing 130. However, there may be a structure including the third inclined portion 124C and the fourth inclined portion 124D formed in the third busbar 116C of the mounted side connector 132, and the hole 134 formed in the fourth busbar 116D of the casing 130.

In the present embodiment, the connector structures 10A, 10B installed in the electric vehicle 100 includes: the plurality of connectors (e.g., the first mounted side connector 14A to the third mounted side connector 14C); the inter-connector conductive members (e.g., the first positive electrode conductive plate 52Ap and the first negative electrode conductive plate 52An) that electrically connect the plurality of connectors; and the casing 12 that houses the inter-connector conductive members, and the cover 72 is attached to an unused connector (e.g., the second mounted side connector 14B) among the plurality of connectors.

Even when various car models or specifications increase the number of components, by providing multiple connectors in advance, it is possible to make it unnecessary to newly change a connector shape (an entire structure, busbars, fuses, etc.), or decrease the change of shape, reduce design man-hours and reduce manufacturing cost.

A car model including a small number of components includes an unused connector. However, by attaching the cover 72 to the unused connector, it is possible to provide a waterproof/dust-proof effect.

In the present embodiment, each inter-connector conductive member includes a first conductive member (e.g., first negative electrode conductive plate 52An) that is electrically connected with a first electrode conductive portion (e.g., first negative electrode conductive member 26An) of the first connector (e.g., first mounted side connector 14A), a second conductive member (e.g., second positive electrode conductive plate 54Bp) that is electrically connected with a second electrode conductive portion (e.g., second positive electrode conductive member 26Bp) of the second connector (e.g., second mounted side connector 14B), a first connection terminal (e.g., bonding terminal 64b) that is provided to the first conductive member, and a second connection terminal (e.g., bonding terminal 64d) that is provided to the second conductive member. A fuse (e.g., second fuse 42B) is inserted in and electrically connected with the first connection terminal and the second connection terminal.

It is easy to mount the fuse by a fuse-insertion method of electrically connecting the fuse between the first connection terminal and the second connection terminal. It is possible to realize a compact structure compared to electrical connection that uses bolts or the like, and miniaturize the entire connector structure.

In the present embodiment, the connector casing 12 at least includes the first casing 12A that supports at least the connectors, and the second casing 12B that supports at least the fuses, and the first casing 12A and the second casing 12B are separable.

The first casing 12A that supports the connectors, and the second casing 12B that supports the fuses are separable. Consequently, it is easy to electrically connect the first conductive member and the second conductive member during manufacturing.

In the present embodiment, an electrode conductive portion (e.g., first electrode conductive member 26A) of at least one of the connectors includes the cylindrical portion 30 and the extended portion 32. The cylindrical portion 30 has the cylindrical shape extending in the mounting direction, and includes the cutout 28 extending in the mounting direction. The extended portion 32 extends outwardly from the portion of the cutout 28. The extended portion 32 and the inter-connector conductive member are electrically connected.

The electrode conductive portion (e.g., first conduct electrode conductive member 26A) of the connector (e.g., first mounted side connector 14A) is formed in a cylindrical shape, and the cutout 28 extending in the mounting direction is formed. Consequently, when the electrode conductive portion 36 of another connector (e.g., mounting side connector 34) is mounted on the electrode conductive portion in the cylindrical shape, the electrode conductive portion in the cylindrical shape elastically deforms to expand in the radial direction. Consequently, it is possible to easily mount the electrode conductive portion 36 of the other connector on the electrode conductive portion in the cylindrical shape. The same applies to a case where the electrode conductive portion in the cylindrical shape is mounted on the electrode conductive portion 36 of the other connector, too.

By forming the extended portion 32 extending from the portions of the cutout 28 of the electrode conductive portion, it is possible to easily connect the extended portions 32 and the inter-connector conductive member.

In this case, as described above, the electrode conductive portion of the connector is formed in a cylindrical shape, and the cutout 28 extending in the mounting direction is formed. Consequently, after the extended portion 32 and the inter-connector conductive member are connected, and when the electrode conductive portion 36 of the other connector is mounted on the electrode conductive portion in the cylindrical shape, the electrode conductive portion in the cylindrical shape elastically deforms to expand in the radial direction from the extended portion 32 connected with the inter-connector conductive member as a base point. Consequently, it is possible to easily mount the electrode conductive portion 36 of the other connector on the electrode conductive portion in the cylindrical shape.

In the present embodiment, the end portion of the cylindrical shape includes the expanded portion 38 that expands in the direction perpendicular to the mounting direction and is configured to allow the end portion of the electrode conductive portion 36 of the mounting side connector 34 to be inserted therein.

By inserting the end portion of the electrode conductive portion 36 of the mounting side connector 34 in the expanded portion 38 in the cylindrical shape, it is possible to connect the first mounted side connector and the mounting side connector without using bolt connection or the like, thereby reducing the number of parts and simplifying a connection operation.

In the present embodiment, in the expanded portion 38 in the cylindrical shape of the one connector structure 10A, the end portion opposite to the expanded portion 38 of the cylindrical shape in the other connector structure 10A is inserted for electrical connection.

It may be effective to use a method of arranging a large number of connectors in advance to prepare for an increase in the number of accessories mounted on the electric vehicle 100. Additionally, by inserting the end portion opposite to the expanded portion 38 having the cylindrical shape of the other connector structure 10A, in the expanded portion 38 having the cylindrical shape of the one connector structure 10A for electrical connection, it is possible to easily increase the number of connectors.

In the present embodiment, one of the first electrode conductive portion 114A of the mounting side connector 110 and the second electrode conductive portion 114B of the mounted side connector 112 includes the first busbar 116A in the plate shape that extends in the mounting direction, and the hole 120 that is formed in the first busbar 116A. The other of the electrode conductive portion 114A of the mounting side connector 110 and the second electrode conductive portion 114B of the mounted side connector 112 includes the second busbar 116B that extends in the mounting direction, the first inclined portion 124A that is raised in one direction from the plate surface 122 of the second busbar 116B, and the second inclined portion 124B that extends from the top portion of the first inclined portion 124A toward the plate surface 122 of the second busbar 116B, and the plate surface 122 and the second inclined portion 124B of the second busbar 116B sandwich and hold the first busbar 116A.

By pressing the mounting side connector 110 and the mounted side connector 112 against each other and further moving them in the direction to move away from each other, the mounting side connector 110 and the mounted side connector 112 can be connected firmly. When the mounting side connector 110 is detached from the mounted side connector 112, by pressing the mounting side connector 110 and the mounted side connector 112 against each other and further moving them in the direction to move away from each other similar to the above, the mounting side connector 110 can be detached from the mounted side connector 112.

In the present embodiment, one of the mounted side connector 132 and the casing 130 includes the third busbar 116C of the plate shape that extends in the mounting direction, and the hole 134 that is formed in the third busbar 116C. The other of the mounted side connector 132 and the casing 130 includes the fourth busbar 116D that extends in the mounting direction, the third inclined portion 124C that is raised in the one direction from the plate surface 136 of the fourth busbar 116D, and the fourth inclined portion 124D that extends from the top portion of the third inclined portion 124C toward the plate surface 136 of the fourth busbar 116D, and the plate surface 136 of the fourth busbar 116D and the fourth inclined portion 124D sandwich the third busbar 116C.

By pressing the casing 130 and the mounted side connector 132 against each other and further moving them in the direction to move away from each other, the mounted side connector 132 can be connected with the casing 130 firmly. When the mounted side connector 132 is detached from the casing 130, by pressing the casing 130 and the mounted side connector 132 against each other and further moving them in the direction to move away from each other similar to the above, the mounted side connector 132 can be easily detached from the casing 130.

It is possible to connect and fix the mounted side connector 132 and the casing 130 without using a fastening member such as a bolt, thereby reducing the number of parts and simplifying a connection operation.

In the present embodiment, the first inclined portion 124A and the second inclined portion 124B are formed integrally with the second busbar 116B. The third inclined portion 124C and the fourth inclined portion 124D are formed integrally with the fourth busbar 116D.

Consequently, by performing punching machining on the second busbar 116B (fourth busbar 116D), it is possible to easily form the first inclined portion 124A (third inclined portion 124C) and the second inclined portion 124B (fourth inclined portion 124D) in the second busbar 116B (fourth busbar 116D), thereby contributing to cost reduction.

In the present embodiment, the housing 40 that protects an outer periphery may be attached to one or more of the connectors among the plurality of connectors except the unused connector. Instead of the housing 40, the cover 72 may be attached in advance to the unused connector among the plurality of connectors. For example, the housing 40 may not be arranged in advance, and the cover 72 may be configured to directly close the insertion port of the housing 40. Consequently, the unused connector does not need the housing 40, so that it is possible to reduce the number of parts.

The electric vehicle 100 according to the present embodiment includes one or more of the above first connector structure 10A to fourth connector structure 10D.

Consequently, it is possible to easily increase or decrease the number of connectors installed in the connector structure according to the number of accessories mounted on the electric vehicle 100, and easily cope with car models having a large number of accessories.

According to the present embodiment, the first connector structure 10A to the fourth connector structure 10D are mounted on a casing of a power converting device or a battery. Consequently, by directly mounting the connector structure on the power converting device or the battery, it is possible to reduce the number of parts. It is possible to use a common connector shape between different car models, and use a common mounting point for high voltage casings. As a result, it is possible to reduce man-hours of high voltage casing design.

According to the present embodiment, the first connector structure 10A to the fourth connector structure 10D may be arranged on a rear surface of the power converting device in a vehicle longitudinal direction. The connector structure is connected with a plurality of high voltage connectors. Even when frontal collision occurs, by arranging the connector structure on the rear surface of the power converting device, it is possible to effectively prevent fracture of the connector structure and exposure of a high voltage portion due to detachment of the fitted connector, while reducing reinforcing members or the like.

The present invention is not limited to the above embodiments, and can be changed freely without departing from the gist of the present invention.

What is claimed is:

1. A connector structure installed in an electric vehicle comprising:
   a plurality of connectors each having a positive electrode terminal and a negative electrode terminal; and
   an inter-connector conductive unit configured to electrically connect the positive electrode terminals of the plurality of connectors and electrically connect the negative electrode terminals of the plurality of connectors,
   wherein the plurality of connectors include a first connector connected to a power supply side, and a plurality of second connectors connected to an accessory side as a load to the power supply,
   the inter-connector conductive unit includes a positive electrode side branch portion branching from the positive terminal of the first connector to the positive terminals of the plurality of second connectors, a plurality of positive electrode side conductive members extending from the positive electrode side branch portion to the positive terminals of the plurality of second connectors, a negative electrode side branch portion branching from the negative terminal of the first connector to the negative terminals of the plurality of second connectors, and a plurality of negative electrode side conductive members extending from the negative electrode side branch portion to the negative terminals of the plurality of second connectors,
   a plurality of fuses are connected between each of the plurality of second connectors and at least one of the plurality of positive electrode side conductive members and the plurality of negative electrode side conductive members,
   the connector structure further comprises a casing configured to house the positive electrode side branch portion, the negative electrode side branch portion, and the plurality of fuses, and
   the connector structure is mounted on a casing of a power converting device or a battery.

2. The connector structure according to claim 1, wherein the plurality of second connectors are positioned outside the casing of the power converting device or the battery.

3. The connector structure according to claim 1, wherein the casing is equipped with a first connection terminal and a second connection terminal,
   the first connection terminal is connected to the positive electrode side conductive members or the negative electrode side conductive members,
   the second connection terminal is connected to the positive terminals or the negative terminals of the plurality of second connectors, and
   the plurality of fuses inserted in and electrically connected with the first connection terminal and the second connection terminal.

4. The connector structure according to claim 1, wherein the casing includes a first casing housing the positive electrode side branch portion and the negative electrode side branch portion, and a second casing housing the plurality of fuses.

5. The connector structure according to claim 4, wherein the first casing and the second casing are separable.

6. The connector structure according to claim 1, wherein the plurality of fuses are connected between one of the positive terminals and the negative terminals of the plurality of second connectors and one of the plurality of positive electrode side conductive members and the plurality of negative electrode side conductive members, and
   the plurality of fuses are arranged in a direction intersecting the positive electrode side conductive members and the negative electrode side conductive members.

7. The connector structure according to claim 1, wherein:
   an electrode conductive portion of at least one of the connectors includes a cylindrical portion and an extended portion, the cylindrical portion having a cylindrical shape extending in a mounting direction and including a cutout extending in the mounting direction, the extended portion extending outwardly from a portion of the cutout in the cylindrical portion; and
   the extended portion and the inter-connector conductive unit are electrically connected.

8. The connector structure according to claim 7, wherein an end portion of the cylindrical portion includes an expanded portion expanding in a direction perpendicular to the mounting direction, and being configured to allow an end portion of an electrode conductive portion of another connector to be inserted therein.

9. The connector structure according to claim 7, wherein the connector structure is provided in plural, and in the expanded portion of the cylindrical portion in one connector structure, an end portion opposite to the expanded portion of the cylindrical portion in another connector structure is inserted for electrical connection.

10. The connector structure according to claim 1, wherein:
    a housing configured to protect an outer periphery is attached to one or more connectors of the plurality of connectors except an unused connector; and
    instead of the housing, a cover is attached in advance to the unused connector of the plurality of connectors.

11. An electric vehicle comprising a connector structure according to claim 1, wherein the connector structure is arranged on a rear surface of the power converting device in a vehicle longitudinal direction.

* * * * *